United States Patent

[11] 3,622,523

| [72] | Inventors | Rajnikant B. Amin;<br>Lewis C. Hoffman, both of Wilmington, Del. |
|---|---|---|
| [21] | Appl. No. | 872,594 |
| [22] | Filed | Oct. 30, 1969 |
| [45] | Patented | Nov. 23, 1971 |
| [73] | Assignee | E. I. du Pont de Nemours and Company<br>Wilmington, Del. |

[54] AIR FIREABLE COMPOSITIONS CONTAINING VANADIUM OXIDE AND BORON, AND DEVICES THEREFROM
13 Claims, 4 Drawing Figs.

[52] U.S. Cl............................................ 252/514,
117/227, 106/47, 252/518
[51] Int. Cl............................................ H01b 1/02,
B44d 1/20
[50] Field of Search............................... 252/512,
514, 518; 117/227; 106/47

[56] References Cited
UNITED STATES PATENTS

| 3,402,131 | 9/1968 | Futaki et al.................. | 252/512 |
| 3,503,902 | 3/1970 | Shimoda...................... | 252/517 |
| 3,480,566 | 11/1969 | Hoffman...................... | 252/514 |
| 3,516,949 | 6/1970 | Hoffman...................... | 252/518 |
| 3,520,831 | 7/1970 | Trap............................. | 252/518 |

*Primary Examiner*—Douglas J. Drummond
*Attorney*—John J. Klocko, III

ABSTRACT: Screen printable, air fireable compositions comprising a vanadium glass, boron, and as optional components, noble metal and/or a low melting inorganic binder, wherein the glass contains 5-55 percent vanadium metal content. Various electronic devices are readily made from these compositions. A unique feature of the devices is their sensitivity to voltage as well as temperature. Consequently, the fired compositions are particularly useful wherever switching devices are needed, e.g., as transient suppressors in electronic equipment.

INVENTORS
RAJNIKANT B. AMIN
LEWIS C. HOFFMAN

INVENTORS
RAJNIKANT B AMIN
LEWIS C. HOFFMAN

AIR FIREABLE COMPOSITIONS CONTAINING VANADIUM OXIDE AND BORON, AND DEVICES THEREFROM

BACKGROUND OF THE INVENTION

Vanadium dioxide ($VO_2$ or $V_2O_4$) has a phase transition temperature at about 68° C. where the monoclinic structure of the low-temperature phase changes to a high-temperature phase having tetragonal rutile structure. This transition is best described as a transition from a first order semiconductor to a metallic conductor. The change in electrical resistance observed between the two states is approximately three orders of magnitude.

U.S. Pat. No. 3,402,131 describes a resistor having an abruptly changing negative temperature coefficient based on vanadium dioxide. The process described in this patent requires three different firing steps: (1) vanadium pentoxide is fused with other oxides in air at a temperature between 670°–1000° C.; (2) the fused product is fired in a reducing atmosphere of ammonia at a temperature within the range of 350°–400° C. in order to transform $V_2O_5$ into $V_2O_4$; and (3) this product is sintered at 1000° C. in an inert or reducing atmosphere to finally shape the product as beads, rods, discs or flakes. This patent does not relate to or describe printable, air-fireable compositions which can be used to form various electrical devices.

Attempts have been made to make thin film switching elements of $VO_2$. K. van Steensel et al. have described such switching elements and Phillips Research Reports 22, pages 170–177 (1967). However, a thin film cannot carry large quantities of power in comparison to thick films, and thin film processing is exacting and time consuming. Therefore, there is a need for a thick film composition which can be screen printed and air fired. Such a composition would make it very convenient to make various complicated configurations of switching elements and electrode assemblies. It is an object of this invention to provide such a composition.

SUMMARY OF THE INVENTION

This invention relates to screen printable, air-fireable compositions comprising, on a weight basis, (1) 35–99 percent of a finely divided vanadium glass, (2) 1–15 percent finely divided boron, (3) 0–50 percent of finely divided noble metal, and (4) 0–20 percent low-melting inorganic binder, wherein said glass contains 5–55 percent vanadium metal. In addition, various electrical devices made by firing the above-described compositions onto a substrate are part of this invention.

A glass batch containing oxides of vanadium and other normal glass constituents is melted in air at a suitable temperature and the molten glass is quickly cooled to prevent crystallization. This vanadium glass is finely ground, mixed with the necessary amount finely divided boron, optionally, finely divided noble metal and/or inorganic binder and dispersed in a liquid vehicle to make a printable paste. An electrical element resulting from the printing and firing of the paste is a sintered product having a $VO_2$ component which imparts a large useful change in resistance over a short temperature range. Devices based on these printed elements have been found to be excellent transient suppression resistors. Any electronic instruments comprising delicate components such as transistors, require protection against overvoltage surges. The devices of this invention, when arranged in parallel circuit with such instruments, will allow normal operation of the instruments at a rated voltage while any overvoltage surge will internally heat the device and transform the device to a low-resistance metallic state. Consequently, most of the overvoltage surge will pass through the device rather than through the delicate electronic component. In general, the screen printed, air fired devices of this invention can be used wherever switching devices are needed.

DESCRIPTION OF THE PREFERRED EMBODIMENTS

Figure 1:
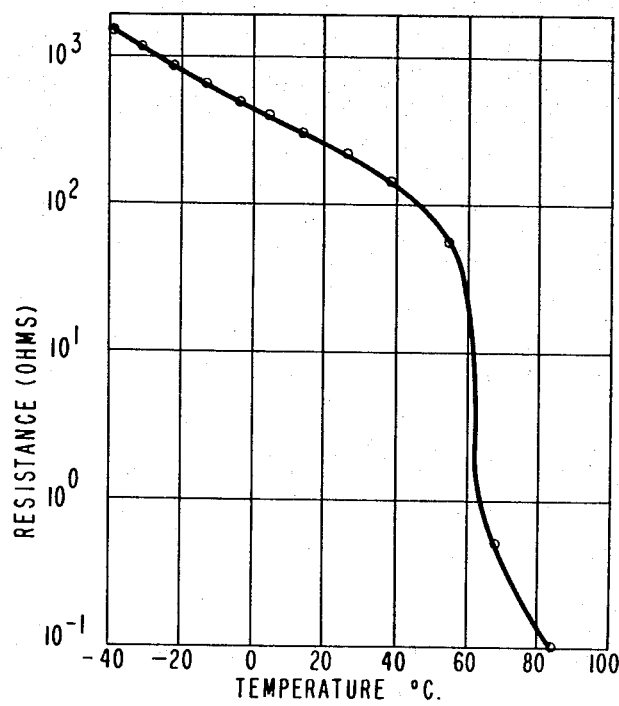
FIGS. 1, 2, 3 and 4 are graphical representations indicating the temperature-resistance characteristics of the electrical elements according to this invention.

The particular glass utilized in the compositions of this invention contains different ingredients in varying proportions, but all of the glasses require the presence of 5–55 percent vanadium metal, preferably in the form of an oxide. When the glass is ultimately fired as a component of the novel compositions, $VO_2$ ($V_2O_4$) is formed in place. The amount of $VO_2$ formed is mainly determined by the amount of vanadium metal present in the glass. For this reason, the glass is defined on the basis of vanadium metal content.

In preparing the glass, vanadium metal or any oxide of vanadium may be used as one of the batch constituents. Vanadium pentoxide is the most convenient to utilize because it has the lowest melting point and is the least expensive. The low melting point of $V_2O_5$ (690° C.) makes it much easier to melt a variety of the common glass constituents in air. The other components of the vanadium glass can be any of the normal glass constituents which are well known in the art. Some of the common glass constituents other than vanadium oxide include: $CaO$, $MgO$, $BaO$, $SrO$, $PbO$, $CdO$, $ZnO$, $Na_2O$, $K_2O$, $Li_2O$, $Al_2O_3$, $Ga_2O_3$, $Cr_2O_3$, $B_2O$, $P_2O_5$, $Ta_2O_5$, $RuO_2$, $TiO_2$, $SiO_2$, $GeO_2$, $WO_3$ and $MoO_3$.

The vanadium glass can be produced by melting suitable batch compositions yielding the prescribed metallic oxides and proportions thereof. The melting of the glass batch can be carried out in a variety of furnaces, such as gas or electric. A container such as a platinum or refractory crucible can be utilized to melt the glass batch. The melting temperature of the glass batch will, of course, vary depending upon the composition of the batch. When a homogenous molten liquid is obtained, the liquid is quickly cooled to retain the glassy structure of the composition. Glass frits are generally prepared by melting the glass batch composed of the desired metal oxides, or compounds which will produce the glass during melting, and pouring the melt into water. The coarse frit is then milled to a powder of the desired fineness.

The compositions of this invention also must contain 1–15 percent of finely divided boron. While this invention is not based on any particular theory, it is believed that the boron acts as a reducing agent for the oxides of vanadium, which may be present in the glass, to form $VO_2$ in place by reduction. At least 1 percent boron must be present to produce $VO_2$-based devices which exhibit a transition from a semiconductor to a metallic state. At the other extreme, excessive amounts of boron, i.e., more than 15 percent, react with $VO_2$ and other oxide components during the firing operation. This produces a moisture-sensitive fire element while not leading to any large useful change in resistance on heating. Therefore, the amount of boron present in the screen printable, air-fireable compositions of this invention should conform with the above-described limits, plus or minus a few percent.

It has also been discovered that a noble metal powder can, optionally, be included in the compositions of this invention. The noble metals include gold, silver, platinum, palladium, osmium, iridium, ruthenium, rhodium, alloys thereof and mixtures thereof. The noble metals lowers the resistance of the $VO_2$-containing element in both the state that is above and below the transition temperature of $VO_2$. A lower resistance above the transition temperature of the $VO_2$-containing element allows larger currents to pass through the fired elements without burning up the elements. Thus, the noble metal additions increase power-carrying capacity of the $VO_2$-containing elements in the "switched on" condition. The amount of noble metal may range between 0–50 percent. The use of more than 50 percent noble metal does not provide any additional power-carrying capacity while increasing the cost of the elements.

Another option component is a low-melting inorganic binder. It has been found desirable, although not necessary, to include a sintering-promoting inorganic binder in the compositions of this invention. The inorganic binder must have a melting point below the melting point of the vanadium glass. Therefore, low melting binders such as lead borates, lead borosilicates, lead silicates, alkali-lead borosilicates, lead alumina borosilicates, etc. may be used. The inorganic binder can be present in amounts ranging from 0–20 percent.

The compositions of the invention will usually, although not necessarily, be dispersed in an inert liquid vehicle to form a paint or paste for application to various substrates. The proportion of vehicle to composition may vary considerably depending upon the manner in which the paint or paste is to be applied and the kind of vehicle utilized. Generally, from 1–20 parts by weight of solids composition (vanadium glass, boron, noble metal) per part by weight of vehicle will be used to produce a paint or paste of the desired consistency. Preferably, 3–10 parts per part of vehicle will be used.

Any liquid, preferably inert, may be employed as the vehicle. Water or any one of various inorganic liquids, with or without thickening and/or stabilizing agents, and/or other common additives, may be utilized as the vehicle. Examples of organic liquids that can be used are the higher alcohols; esters of such alcohols, for example, the acetates and propionates; the terpenes such as pine oil, alpha- and beta-terpineol and the like; and solutions of resins such as the polymethacrylates of lower alcohols, or solutions of ethyl cellulose, in solvents such as pine oil and the monobutyl ether of ethylene glycol monoacetate (butyl-0-$CH_2CH_2$-$OOCH_3$). The vehicle may contain or be composed of volatile liquids to promote fast setting after application; or it may contain waxes, thermoplastic resins or the like materials which are thermofluid so that the vehicle-containing composition may be applied to an elevated temperature to a relatively cold ceramic body upon which the composition sets immediately.

The compositions are conventionally made by admixing the components in their respective proportions. Additionally, one part of vehicle for every 1–20 parts of solids mentioned above may be admixed. The compositions are then applied to a dielectric body and fired to form stable electrical devices.

Application of the compositions in paint or paste form to the substrate may be effected in any desired manner. It will generally be desired, however, to effect the application in precise pattern form, which can be readily done by applying well known screen stencil techniques or methods. The resulting print pattern will then be fired in the usual manner at a temperature from about 600°–900° C. for a time within the range of 1–20 minutes. It has been found that excessively long firing times and high firing temperatures will oxidize the vanadium components of the glass to vanadium pentoxide. It is well known that vanadium pentoxide does not exhibit a semiconductor to metal transition stage and, therefore, is not acceptable for purposes of this invention. A preferred firing temperature and time is 650°–800° C. for 2–10 minutes.

The invention is illustrated by the following examples. In the examples and elsewhere in the specification, all parts, ratios and percentages of materials or components are by weight. Various glass compositions were melted and fritted. Each of the constituents present in the glass and the proportions thereof are reported in table I.

In the following examples the glasses of table I were utilized to prepare screen-printable, air-fireable compositions. The fritted glasses, boron powder, and optionally, noble metal were dispersed in an inert vehicle (8 percent ethyl cellulose and 92 percent beta-terpineol) at a ratio of about 4:1. The paste compositions were screen printed onto a 96 percent alumina substrate onto which platinum/gold electrodes had been previously printed and fired. The printed pastes were fired to produce electrical elements which exhibited a transition from semiconductor to metallic behavior as temperature was increased.

EXAMPLE 1

A composition comprising 95 percent glass No. 1 and 5 percent boron powder was printed between two platinum-gold electrodes. After drying, the coated substrate was fired in air at 670° C. for 5 minutes to form an electrical element on the substrate. The finished device was tested by measuring its resistance as a function of temperature. It was observed that the transition temperature was at about 60° C. and the resistance changed approximately 3 orders of magnitude. The results are shown in FIG. 1.

EXAMPLE 2

Figure 2:
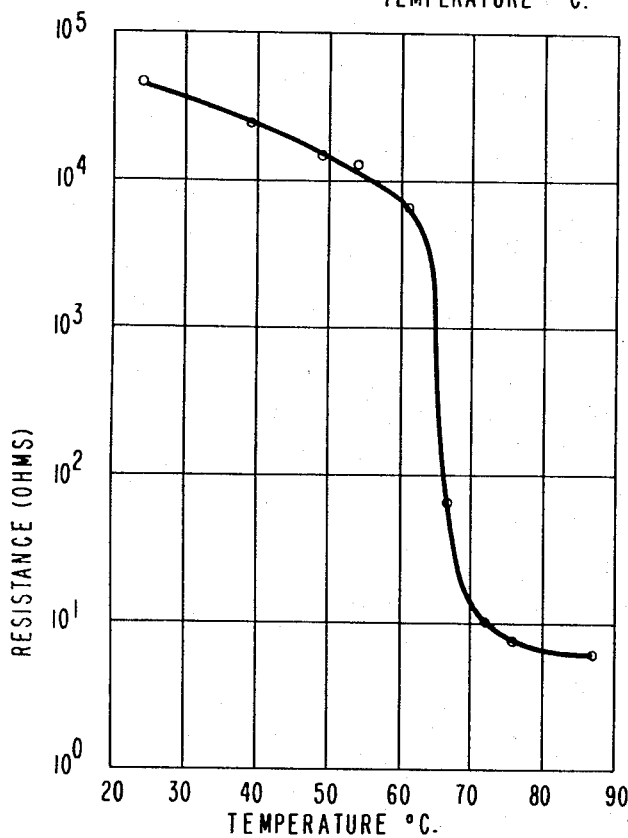
Figure 3:
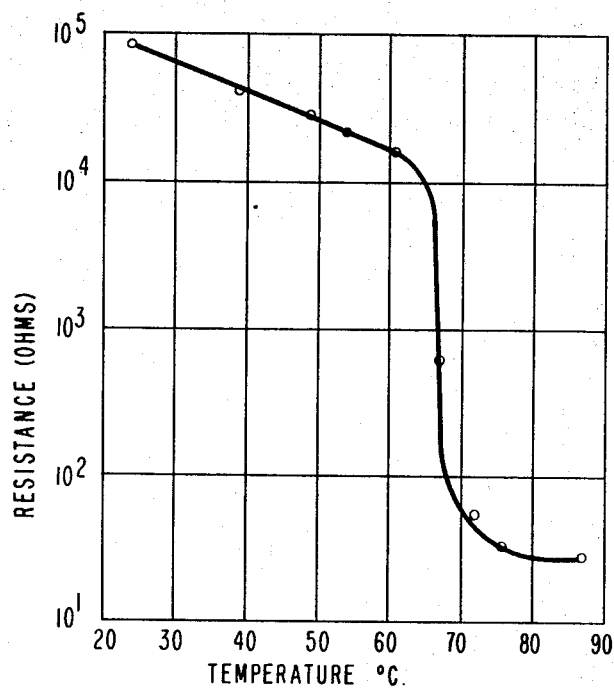
Figure 4:
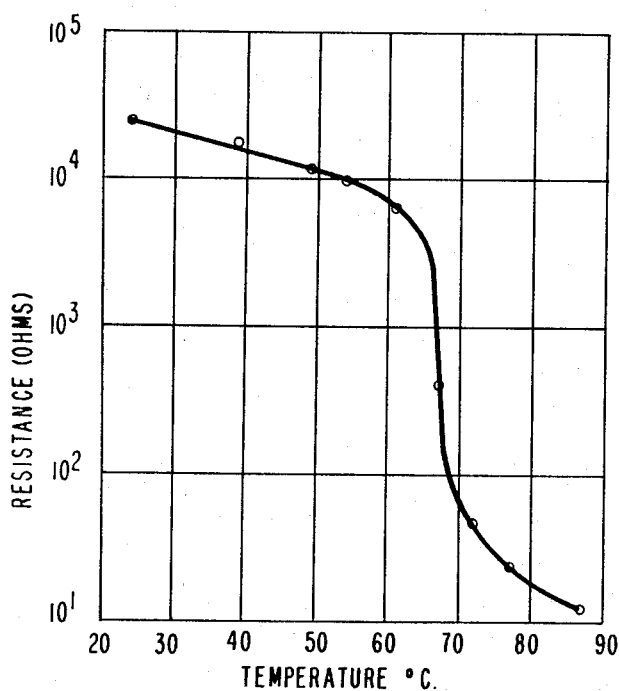

A composition comprising 70 percent glass No. 2, 4 percent boron powder and 26 percent gold was printed between two platinum-gold electrodes. After drying, the coated substrate was fired in air at 700° C. for 5 minutes. A second composition containing the same proportions of ingredients, except that glass No. 5 was utilized, was prepared, applied and fired. A third composition comprising 96 percent glass No. 8 and 4 percent boron powder was also prepared, applied and fired. The finished devices of these three compositions were tested by measuring their resistance as a function of temperature. The results, reported in resistance as a function of temperature, are shown in FIGS. 2, 3 and 4. These results indicate that the air fired devices show a large change in resistance over a very short temperature range, indicating that the $VO_2$ phase which developed during the firing operation, goes through a semiconductor to metallic state transition.

EXAMPLE 3

Three devices were prepared, each showing a large change in resistance from 25° C. to 100° C., and also showing a sharp drop in resistance over short temperature range. The first composition contained 98 percent glass No. 6 and 2 percent boron powder; the second composition contained 98 percent glass No. 8 and 2 percent boron powder; the third composition contained 96 percent glass No. 4 and 4 percent boron powder. These compositions were prepared, printed and fired at 700° C. for 5 minutes. The resistances of the fired devices at 25° C. and 100° C. were: (1) 2367 ohms and 485 ohms; (2) 128,300 ohms and 61 ohms; and (3) 1040 ohms and 265 ohms.

EXAMPLE 4

The effect of the presence of the noble metal in the compositions of this invention is shown in table II. A procedure similar to example 1 was followed to prepare the devices. The results show that the addition of a noble metal such as gold to the vanadium glass-boron system aids in lowering the resistance at room temperature as well as at 100° C. Thus, by adding noble metals, one can obtain $VO_2$-based devices which have lower resistances in "on-and-off" states. This, in turn, provides a higher power carrying capacity to the device in an "on" state.

TABLE I.—WEIGHT PERCENT OXIDE COMPOSITION OF VANADIUM GLASSES

| Glass No | 1 | 2 | 3 | 4 | 5 | 6 | 7 | 8 |
|---|---|---|---|---|---|---|---|---|
| $V_2O_5$ | 60.0 | 80.0 | 75.0 | 90.0 | 75.0 | 30.0 | 20.0 | 75.0 |
| $SiO_2$ | 10.0 | 3.0 | 5.0 | 0.5 | | 5.0 | 5.0 | |
| $B_2O_3$ | 5.0 | | | | 3.0 | 10.0 | 20.0 | 3.0 |
| $PbO$ | 10.0 | | 5.0 | | | | | |
| $CdO$ | 5.0 | | 5.0 | | 11.0 | 15.0 | 15.0 | 9.5 |
| $BaO$ | 5.0 | 17.0 | 5.0 | 9.5 | 11.0 | 15.0 | 15.0 | 9.5 |
| $P_2O_5$ | 5.0 | | | | | | | |
| $GeO_2$ | | | | | | 10.0 | 10.0 | 3.0 |
| $ZnO$ | | | | | | 10.0 | 15.0 | |

TABLE II.—WEIGHT PERCENT

| | Glass | | | | |
|---|---|---|---|---|---|
| | No. 2, 95 | No. 2, 90 | No. 2, 70 | No. 3, 96 | No. 3, 70 |
| Boron | 4 | 4 | 4 | 4 | 4 |
| Gold | 1 | 6 | 26 | 0 | 26 |
| Resistance (ohms) at 25° C. | 205,000 | 180,000 | 43,000 | 138,000 | 17,000 |
| Resistance (ohms) at 100° C. | 37 | 26 | 7 | 84 | 23 |

In a DC circuit, such as that employed to operate a radio in an automobile, a battery is connected to the radio in parallel relation through the ignition switch which is in series relation. Also connected to the battery in parallel relation are various inductive loads (e.g. motors for operating the windshield wipers, the air conditioner, the windows, the seats, etc.). In the absence of a transient suppressing device, the inductive loads discharge through the radio to ground when the ignition switch is opened because it is in the nature of an inductance for the current to lag behind the voltage. Large voltages (e.g. 200–300 volts) with pulse widths of 1–2 milliseconds have been observed in the arrangement described above. The voltage surge can be suppressed from the radio by connecting before the radio a $VO_2$ device of this invention and a load resistor in parallel relation to the radio. The voltage transient, occurring when the ignition switch is opened, generates sufficient temperature in the $VO_2$ device to cause the device to change to lower resistance (semiconductor to metallic behavior). Thereafter the current from the 200–300 volt transient is passed to the load resistor to ground, rather than going through the radio and destroying delicate solid state devices in the radio. The following example demonstrates this concept.

EXAMPLE 5

A composition comprising 51 percent glass No. 8, 4 percent boron powder, 35 percent silver powder and 10 percent inorganic binder (80 percent PbO, 11 percent $B_2O_3$, 9 percent $SiO_2$) was screen printed as a pad between two platinum-gold electrodes which had been previously fired onto an alumina chip. After drying, the coated substrate was fired at 760° C. for 5 minutes. This $VO_2$ device was connected in series relation with a 5 ohm load resistor; the device was also connected in parallel relation with a solid state radio, a 10 milihenry induction coil, and a 12 volt battery. The battery switch was turned "on" and the current passed to the induction coil, the $VO_2$ device and the radio. When the switch was turned "off," the voltage surge generated sufficient heat to cause the $VO_2$ device to change to lower resistance. The current from the voltage transient passed to the load resistor to ground. Consequently, the voltage transient did not harm any delicate solid state devices in the radio. In the absence of the $VO_2$ device, the solid state radio was damaged and could not be operated after a relatively short period of use.

The compositions of this invention may also contain minor amounts of additional constituents which modify and/or improve the electrical properties of the fired elements. Due to the ability of the fired elements to transform from semiconductors to metallic behavior, widely diversified uses may be made of this invention. Consequently, it is possible to conveniently and easily apply the compositions of this invention through conventional thick film techniques to form elements which are utilized in temperature-controlling devices, temperature-alarming devices, fire-alarms, etc.

We claim:

1. A screen printable, air-fireable composition comprising, on a weight basis, (1) 35–99 percent of a finely divided vanadium glass, (2) 1–15 percent finely divided boron, (3) 0–50 percent of finely divided noble metal, and (4) 0–20 percent low melting inorganic binder, wherein said glass contains 5–55 percent vanadium metal.

2. A composition in accordance with claim 1 which is dispersed in an inert liquid vehicle.

3. A screen printable, air-fireable composition comprising, on a weight basis, (1) 54–77 percent of a finely divided vanadium glass, (2) 3–6 percent finely divided boron, (3) 20–40 percent of finely divided noble metal, and (4) 0–20 percent low melting inorganic binder, wherein said glass contains 5–55 percent vanadium metal.

4. A composition in accordance with claim 3 wherein the noble metal is gold.

5. A composition in accordance with claim 3 wherein the vanadium glass contains $V_2O_5$.

6. A composition in accordance with claim 3 wherein the inorganic binder is present in an amount within the range of 2–15 percent.

7. An electrical element comprising the fired composition in accordance with claim 1.

8. An electrical element comprising the fired composition in accordance with claim 3.

9. An electrical device comprising a substrate having the composition in accordance with claim 1 in firmly adherent relationship thereto.

10. An electrical device comprising a substrate having the composition in accordance with claim 3 in firmly adherent relationship thereto.

11. An electrical device comprising a substrate having the composition in accordance with claim 6 in firmly adherent relationship thereto.

12. A transient suppressor device comprising the fired composition of claim 1.

13. A transient suppressor device comprising the fired composition of claim 3.

* * * * *